United States Patent
Jactat (10) Patent No.: US 11,856,512 B2
(45) Date of Patent: *Dec. 26, 2023

(54) METHODS AND DEVICES FOR ACCESSING A RADIO ACCESS NETWORK

(71) Applicant: JRD COMMUNICATION (SHENZHEN) LTD., Guangdong (CN)

(72) Inventor: Caroline Jactat, Guangdong (CN)

(73) Assignee: JRD COMMUNICATION (SHENZHEN) LTD., Shenzhen (CN)

(*) Notice: Subject to any disclaimer, the term of this patent is extended or adjusted under 35 U.S.C. 154(b) by 16 days.

This patent is subject to a terminal disclaimer.

(21) Appl. No.: 18/145,861

(22) Filed: Dec. 23, 2022

(65) Prior Publication Data

US 2023/0125927 A1 Apr. 27, 2023

Related U.S. Application Data

(63) Continuation of application No. 17/321,023, filed on May 14, 2021, now Pat. No. 11,582,687, which is a (Continued)

(30) Foreign Application Priority Data

Jan. 5, 2017 (GB) .................... 1700161

(51) Int. Cl.
*H04W 48/18* (2009.01)
*H04W 74/00* (2009.01)
(Continued)

(52) U.S. Cl.
CPC .......... *H04W 48/18* (2013.01); *H04W 48/14* (2013.01); *H04W 72/51* (2023.01);
(Continued)

(58) Field of Classification Search
CPC ... H04W 72/048; H04W 76/18; H04W 76/27; H04W 48/14; H04W 48/18; H04W 74/002; H04W 74/006
See application file for complete search history.

(56) References Cited

U.S. PATENT DOCUMENTS

2013/0286937 A1 10/2013 Liu et al.
2016/0044713 A1 2/2016 Du
(Continued)

FOREIGN PATENT DOCUMENTS

CN 104683081 A 6/2015
CN 104838713 A 8/2015
(Continued)

OTHER PUBLICATIONS

Written Opinion of the International Search Authority in international application No. PCT/CN2017/119215, dated Mar. 26, 2018.
(Continued)

*Primary Examiner* — Chi H Pham
*Assistant Examiner* — Vladislav Y Agureyev
(74) *Attorney, Agent, or Firm* — PV IP PC; Wei Te Chung; Zhigang Ma (57) ABSTRACT

A method is provided for enabling a User Equipment to access services provided by a radio access network by configuring the User Equipment (UE) with configuration information which comprises rules for selecting one or more of a plurality of access procedures to be used by the UE for accessing services provided by the radio access network which may be a New Radio/5G network. Access procedures may include a grant-based procedure; a grant-free procedure and a fallback procedure to be used in cases of failure of an initial access attempt. The rules may be based on the type of service required by the UE such as; transmission and/or
(Continued)

reception of data, transmission and/or reception of a voice call, a request for System Information.

30 Claims, 4 Drawing Sheets

Related U.S. Application Data continuation of application No. 16/476,149, filed as application No. PCT/CN2017/119215 on Dec. 28, 2017, now Pat. No. 11,039,385.

(51) Int. Cl.
*H04W 76/18* (2018.01)
*H04W 76/27* (2018.01)
*H04W 48/14* (2009.01)
*H04W 72/51* (2023.01)

(52) U.S. Cl.
CPC ......... *H04W 74/002* (2013.01); *H04W 76/18* (2018.02); *H04W 76/27* (2018.02)

(56) References Cited

U.S. PATENT DOCUMENTS

| | | | | |
|---|---|---|---|---|
| 2016/0135145 A1* | 5/2016 | Tirronen | ........... | H04W 74/0833 370/336 |
| 2018/0035469 A1* | 2/2018 | Chen | ................ | H04W 74/0833 |
| 2018/0092125 A1* | 3/2018 | Sun | ...................... | H04W 74/02 |
| 2018/0098298 A1* | 4/2018 | Jung | ................ | H04W 74/0833 |
| 2018/0138962 A1* | 5/2018 | Islam | .................. | H04B 7/0695 |
| 2020/0389868 A1* | 12/2020 | Martin | .................. | H04W 76/11 |

FOREIGN PATENT DOCUMENTS

| | | | |
|---|---|---|---|
| CN | 105722234 A | 6/2016 | |
| IN | 103109574 A | 5/2013 | |
| WO | 2014130091 A1 | 8/2014 | |
| WO | 2016123568 A1 | 8/2016 | |
| WO | 2017196146 A1 | 11/2017 | |
| WO | WO-2018121848 A1 * | 7/2018 | ........... H04B 7/0617 |

OTHER PUBLICATIONS

International Search Report in International application No. PCT/CN2017/119215, dated Mar. 26, 2018.
1st Office Action issued in corresponding Chinese Patent Application No. 201780085803.3, dated Sep. 5, 2022, pp. 1-11.
Huawei et al., "3GPP TSG-RAN WG2 #96, R2-168544", UL data transmission in RRC_INACTIVE, Nov. 18, 2016 (Nov. 18, 2016), 1-15.
Interdigital Communications, "3GPP TSG-RAN WG2 #96, R2-168465", Random Access Procedure in NR, Nov. 18, 2016 (Nov. 18, 2016), 1-15.
Ericsson, "3GPP TSG-RAN WG2 #96, Tdoc R2-168665", Random Access enhancements, Nov. 18, 2016 (Nov. 18, 2016), 1-15.
Examination report issued in Great Britain Patent Application No. 1700161.1 dated Mar. 9, 2021.

* cited by examiner

METHODS AND DEVICES FOR ACCESSING A RADIO ACCESS NETWORK

CROSS REFERENCE TO RELATED APPLICATIONS

The disclosure is a continuation of U.S. application Ser. No. 17/321,023, filed on May 14, 2021, titled "METHODS AND DEVICES FOR ACCESSING A RADIO ACCESS NETWORK", which is a continuation of U.S. application Ser. No. 16/476,149, filed on Jul. 5, 2019, titled "METHODS AND DEVICES FOR ACCESSING A RADIO ACCESS NETWORK", which is a National Stage of International patent application PCT/CN2017/119215, filed on Dec. 28, 2017, which claims priority to foreign Great Britain patent application No. GB 1700161.1, filed on Jan. 5, 2017, the disclosures of which are incorporated by reference in their entirety.

BACKGROUND OF DISCLOSURE

1. Field of Disclosure

Embodiments of the present invention generally relate to wireless communication systems and in particular to devices and methods for enabling a wireless communication device, such as a User Equipment (UE) or mobile device to access a Radio Access Technology (RAT) or Radio Access Network (RAN).

2. Description of Related Art

Wireless communication systems, such as the third-generation (3G) of mobile telephone standards and technology are well known. Such 3G standards and technology have been developed by the Third Generation Partnership Project (3GPP). The 3rd generation of wireless communications has generally been developed to support macro-cell mobile phone communications. Communication systems and networks have developed towards a broadband and mobile system. The 3rd Generation Partnership Project has developed the so-called Long Term Evolution (LTE) system, namely, an Evolved Universal Mobile Telecommunication System Territorial Radio Access Network, (E-UTRAN), for a mobile access network where one or more macrocells are supported by a base station known as an eNodeB or eNB (evolved NodeB). More recently, LTE is evolving further towards the so-called 5G or NR (new radio) systems where one or more cells are supported by abase station known as a gNB.

The NR access technology aims to meet a broad range of use cases which includes enhanced mobile broadband, massive Machine Type Communications (MTC), and critical MTC. Operating frequency ranges of up to 100 GHz are currently under consideration for this new RAT. It is also envisaged that the new RAT will be able to tightly interwork with existing LTE radio systems up to mobile network operator deployment. For initial access of an NR network by a UE, two initial access schemes have been proposed. A first scheme comprises either a four-step contention-based Random Access procedure or a three-step non-contention based Random Access procedure, both procedures being similar to those used in LTE systems. Basically, a UE transmits a Radio Resource Control (RRC) signalling message ahead of any data or other signalling message (e.g. Location Update) towards the Core Network.

A second scheme comprises two steps and is also known as grant-free (contention based) transmission. The UE may transmit a "small" (subject to a threshold configuration for example) amount of data without the use of a RRC (Radio Resource Control) signalling message beforehand and without Radio Access preamble assignment. An optimized UE power consumption state "RRC_INACTIVE" is defined and the UE performs fewer actions (e.g. radio measurements monitoring) compared with its activities in the "RRC_CONNECTED" state in LTE systems. In an NR system and in the RRC_INACTIVE state, the UE will be mainly performing uplink and/or downlink data transmission.

However, it has not yet been decided how such a proposed two-step scheme should be configured for NR systems.

Another challenge is how to direct downlink data transmissions (from a gNB to a UE) which are not in direct response to any uplink activity when the UE is in RRC_INACTIVE mode without the UE having to change to an RRC_CONNECTED state.

A further challenge concerns defining a fallback procedure for dealing with the situation where a UE starts to access a NR network using the above-mentioned two-step scheme but the procedure fails. This can happen owing to contention resolution failure after a number of re-attempts or because many UEs are simultaneously attempting access.

Another issue to address concerns the case where a UE needs certain System Information which is not currently being provided by the serving NR cell or by a proximate LTE cell (e.g. SI BlockX pertaining to some radio feature) and specifically, what should the UE use as an initial access procedure in order to inform the NR network that it needs to obtain the System Information. Compared to an LTE system, an NR system might not provide the full set of System Information in some NR cells for energy efficiency and signalling overhead reduction purposes.

A further question to resolve is how can the UE, at some point in time, improve its chances of successfully transmitting and receiving data i.e. have fewer transmission failures. For example, data transmission may fail while the UE is in the RRC_INACTIVE state because of UE mobility and the relaxation of measurement reporting in this state.

Another question to resolve concerns the case where an NR system is interworking with an LTE system, given that user plane data is being handled by the NR system. If data needs to be transported in RRC signalling, then how can the UE be aware that such data would be needed to be transmitted to the NR cell? Indeed in existing dual connectivity arrangements using two LTE cells or an LTE system interworking with a Wi-Fi system (so called LTE WLAN Aggregation), any signalling is transmitted to one LTE cell only (or to the LTE cell for LWA). Hence unlike legacy system, signalling needs handling by two interfaces.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to a first aspect of the present invention there is provided a method for enabling a wireless communication device to access services provided by a Radio Access Network, the method comprising: configuring the wireless communication device with configuration information wherein the configuration information comprises rules for selecting one or more of a plurality of access procedures to be used by the wireless communication device for accessing services provided by the Radio Access Network.

In one embodiment, the method includes transmitting the configuration information from a base station to the wireless communication device.

The access procedures may include at least one of the following; a grant-free procedure; a grant-based procedure; a grant-free procedure for downlink only; a procedure including use of a signalling message; a procedure not including use of a signalling message; a fallback procedure to be used in cases of failure of an initial access attempt; accessing an alternative Radio Access Network.

The signalling message may comprise a Radio Resource Control (RRC) message.

In some embodiments, the wireless communication device may inform the base station of its capabilities with regard to which access procedures it is capable of using. For instance, some wireless communication devices may not necessarily be capable of supporting a grant-free access procedure. In such cases, the rules are tailored to match the wireless communication device's capabilities.

The rules may be based on a type of service required by the wireless communication device. A type of service may include at least one of: transmission and/or reception of data; transmission and/or reception of a voice call; transmission and/or reception of a signalling message; a request for System Information; delay tolerant access; transmission of a UE Location Update; transmission of an exceptional event.

The rules may be in a format appropriate for the wireless communication device's implementation.

In one embodiment, the rules dictate under what circumstances the wireless communication device should or should not obtain a grant allocation in advance of requesting access to services.

In one embodiment, the rules dictate that the wireless communication device should obtain a grant allocation in advance of requesting access to services in the event of failure of an attempted grant free procedure.

In one embodiment, the method further comprises establishing an interworking interface between the Radio Access Network and an alternative Radio Access Network. The Radio Access Network maybe a New Radio (NR/5G) network and the alternative network may be an LTE network.

In one embodiment, the wireless communication device may include an indication of its current state in a data transmission to a base station. The indication may or may not be requested by the Radio Access Network.

In one embodiment, the base station may include an indication of a target state in a data transmission to the wireless communication device.

The wireless communication device may provide an indication of pending data transmission related information to a base station. Such information may relate to a buffer size. Such information may be included in a data transmission from the wireless communication device to the base station. The information may or may not be requested by the radio access network.

Such indications provided to the base station by the wireless communication device may be provided in a format as per the wireless communication device's implementation.

In cases where the wireless communication device requires System Information, the procedure may be based on a signalling message which may be a Radio Resource Control (RRC) message. The Radio Access Network may store System Information which has been requested by the wireless communication device for future use in case it is requested again by the wireless communication device. System information may be required if the wireless communication device moves to another Radio Access Network or requires a System Information update. A request for System Information from the wireless communication device may be directed to the Radio Access Network or to another Radio Access Network.

The invention permits the two-step (grant-free) access scheme described above to be implemented in a NR/5G system under certain circumstances. Rules for using the two-step scheme according to the type of service required can result in a reduction of access failures. Indeed the more accesses that are attempted using this grant-free (contention based) scheme, the higher the probability of failure. Application of the rules in accordance with the invention can, advantageously, restrict usage of this two-step scheme. In cases where there is an interworking interface between an NR system and an LTE system, the rules allow a distribution of the different access procedures between systems. For example the rules may allow offloading signalling from one system to another, for example from an NR system to an LTE system. This can be advantageous because signalling is less latency-sensitive than data.

Advantageously, the invention also permits the transmission of downlink data while the wireless communication device is in RRC_INACTIVE mode. This can be achieved by the wireless communication device indicating to the base station (in a message) its current state (specifically the target RRC state) along with its data transmissions. Alternatively, this can be achieved by the base station indicating to the wireless communication device (in a message), along with its data transmissions, a target state (specifically the target RRC state) to which the UE should be moving to. By encapsulating the data in such a message, an RRC signalling message overhead can be avoided while keeping synchronisation of the RRC state between the wireless communication device and the Radio Access Network. This can also result in fewer data transmission failures as the reception of a dynamic indication of the wireless communications device's state along with the data allows the Radio Access Network to decide whether or not it would be best to instruct the wireless communication device to change to a more robust state where a greater amount of data can be transmitted without failure (as per being allocated adequate grants). This dynamic indication of RRC state along with the data transmission also results in reducing the latency to move to such a state. Minimising the latency in moving between RRC states (in particular RRC_INACTIVE and RRC_CONNECTED), is a requirement for an NR system. In an LTE system, moving between RRC states requires a configuration process including a three-message exchange between the RAN and the wireless communication device.

Advantageously, the rules may permit the wireless communication device to timely recover from a failure of a two-step (grant-free) access attempt as the wireless communication device is not able to know whether a further two-step attempt would fail or not. The rules may dictate that the wireless communication device selects a grant-based access procedure following failure of one or more attempts at a grant-free access procedure.

Advantageously, application of the rules by the wireless communication device can provide it with some flexibility for handling SI requests. For instance, the rules may permit use of a two-step (grant-free) or a four-step (grant-based) access procedure for requesting System Information. The network receiving the request may memorise the request to provide specific SI blocks in order to avoid the wireless communication device having to request them again when such blocks are not already provided to it. In a case where an interworking interface has been established between the radio access network (for example NR) and another radio access network (for example LTE) the rules may allow offloading System Information requests (which are less latency-sensitive than data) from the NR network to the LTE network According to a second aspect of the invention there is provided a base station arranged to transmit configuration information to a wireless communication device wherein the configuration information comprises rules for selecting one or more of a plurality of access procedures to be used by the wireless communication device for accessing services provided by a Radio Access Network.

According to a third aspect of the invention, there is provided a wireless communication device configured with configuration information comprising rules for selecting one or more of a plurality of access procedures to be used by the wireless communication device for accessing services provided by a Radio Access Network.

The wireless communication device may be adapted to receive the configuration information from a base station.

The wireless communication device may use the rules for selecting one or more of said plurality of access procedures to be used for accessing services based on its implementation i.e. without receiving the configuration information from a base station.

The wireless communication unit may adapt the rules for selecting one or more of said plurality of access procedures to be used for accessing services based on results of previous access attempts. For example, awareness of previous grants allocated to the wireless communication unit by the radio access network, and/or awareness of uplink radio signal conditions, and/or location information change can assist the wireless communication unit in choosing the most appropriate access procedure (i.e. grant-free or grant-based) to use.

According to a fourth aspect of the invention, there is provided a non-transitory computer readable medium having computer readable instructions stored thereon for execution by a processor to perform the method according to the first aspect.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory.

BRIEF DESCRIPTION OF DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

DETAILED DESCRIPTION OF EMBODIMENTS

Those skilled in the art will recognise and appreciate that the specifics of the examples described are merely illustrative of some embodiments and that the teachings set forth herein are applicable in a variety of alternative settings.

Figure 1:
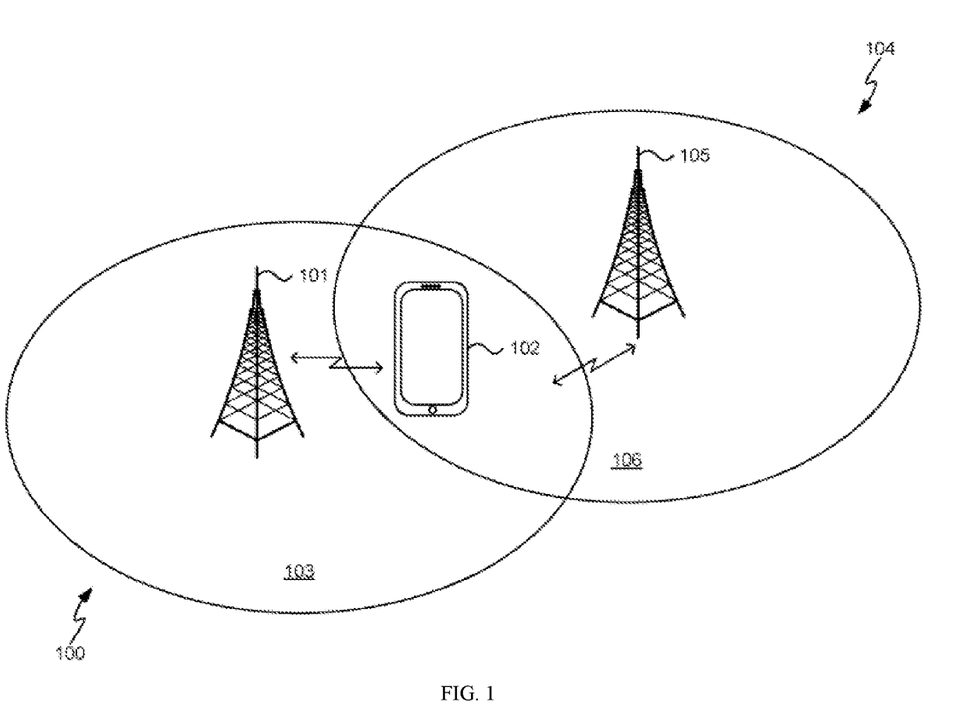
FIG. 1 is a simplified block diagram of Radio Access Networks operating in accordance with an example embodiment.

FIG. 1 shows a Radio Access Network (RAN) 100 which in this example is a 5G/NR network. The NR RAN 100 may include a number of gNBs, one, 101, being shown in the Figure and other network entities (not shown). The gNB 101 communicates with a User Equipment (UE) 102 and supports a respective cell 103. The gNB 101 performs the function (amongst others) of that of a base station. The UE 102 may be for example, a cell phone, smart phone, wireless modem, laptop computer or other wireless communication device. The NR RAN 100 is proximate to another RAN which in this embodiment is an LTE network 104. The LTE network 104 may include a number of eNBs, one, 105 being shown in the Figure and other network entities (not shown). The eNB 105 supports a respective cell 106 which may at least partially overlap with the cell 103 of the gNB 101. In this embodiment an interworking interface is established between the gNB 101 and the eNB 105. The UE 102 is capable of communicating with either the gNB 101 or the eNB 105 or both.

Figure 2:
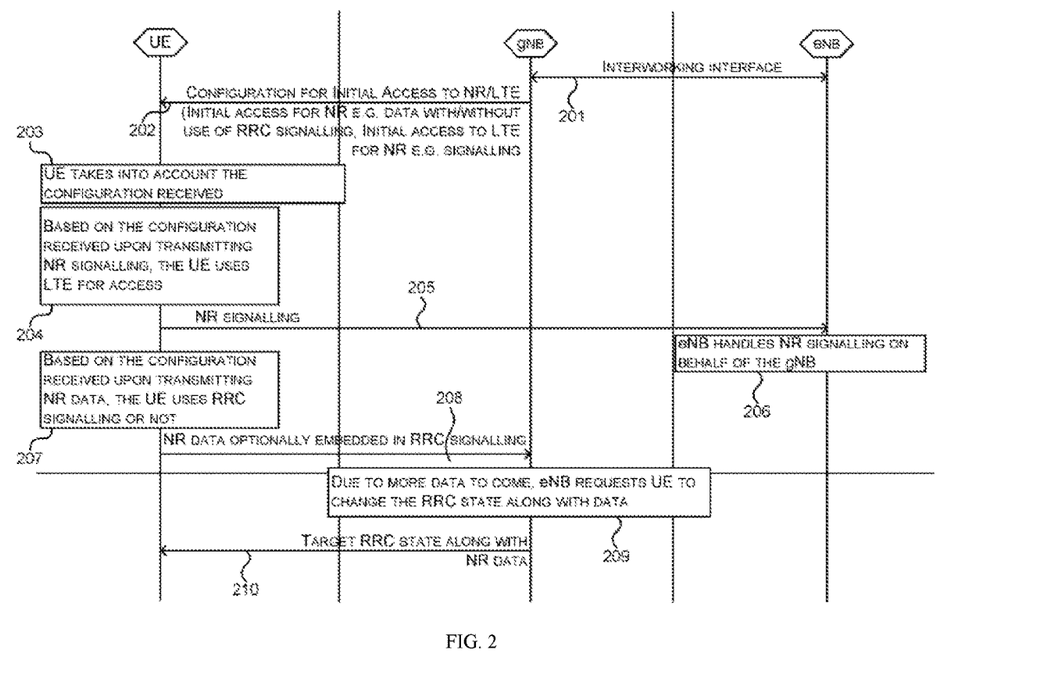
FIG. 2 is a message sequence chart illustrating a first example of a sequence of operations for accessing Radio Access Network services.

Referring now to FIG. 2, at 201 an interworking interface is established between the gNB 101 and the eNB 105 of the systems described above with reference to FIG. 1. At 202, the gNB sends to the UE (102 of FIG. 1) configuration information for initial access (of the UE 102) to the NR system via the gNB for the transmission of data with or without the use of RRC signalling or via the eNB with signalling. At 203, the UE receives the configuration information and takes this into account when selecting an access procedure. At 204, based on the configuration received, the UE chooses to use LTE for access and so at 205 the UE transmits NR signalling to the eNB. At 206, the eNB handles the received NR signalling on behalf of the gNB. Alternatively, at 207 based on the configuration received, the UE chooses whether to use RRC signalling or not. If it chooses to use RRC signalling, it can embed data in the signalling and send this, at 208, to the gNB. At 209, if the eNB knows that there is more data to come from the UE, then the eNB may decide to request that the UE change the RRC state along with the data. At 210 a message is sent from the gNB to the UE and including a target RRC state along with the data transmission.

Figure 3:
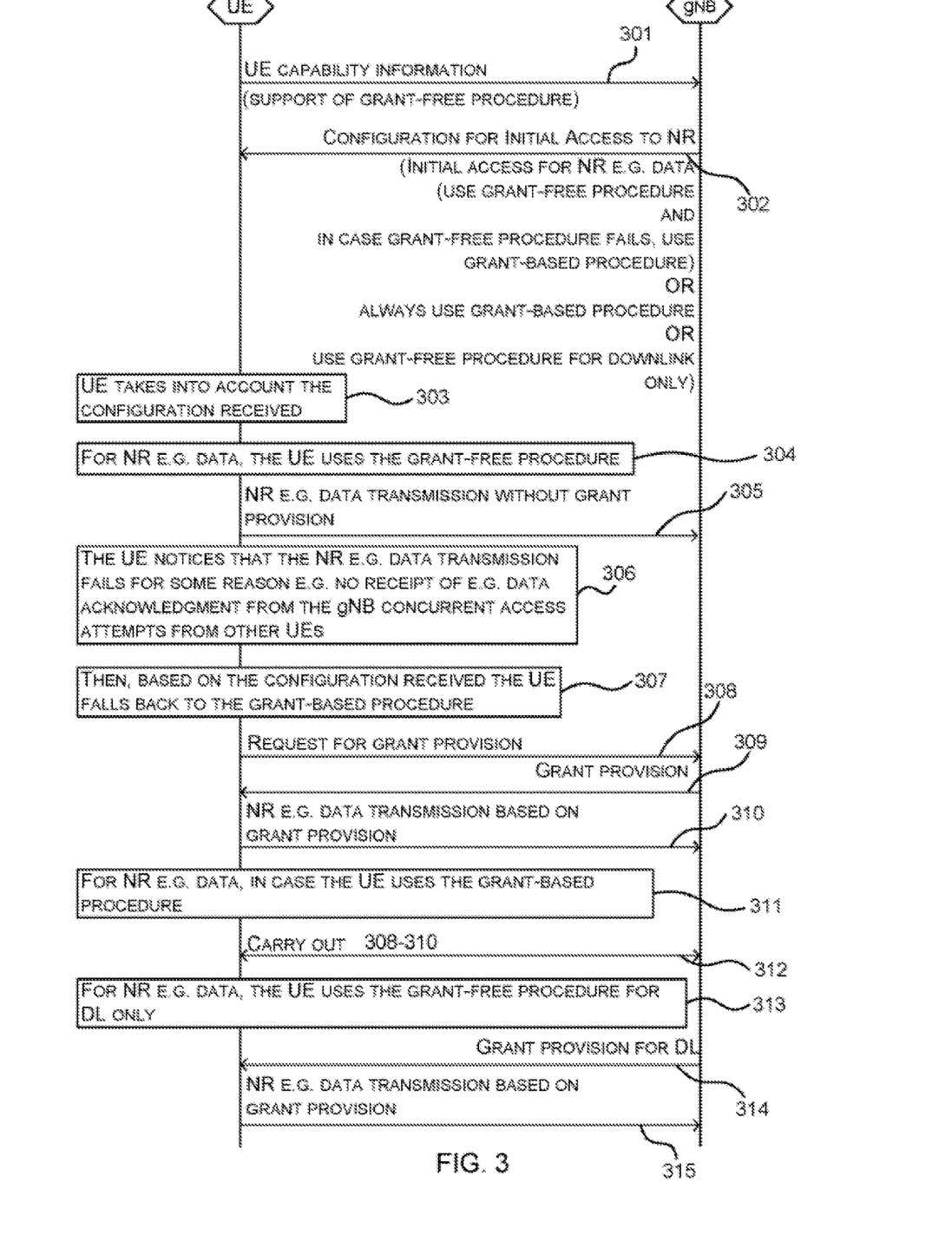
FIG. 3 is a message sequence chart illustrating a second example of a sequence of operations for accessing Radio Access Network services.

Referring now to FIG. 3, at 301, the UE (102 of FIG. 1) sends to the gNB (102 of FIG. 1) capability information. In this example, the capability information informs the gNB that the UE 102 is capable of performing a grant-free access procedure. At 302, the gNB sends configuration information to the UE which comprises rules to assist the UE in choosing one of a plurality of access procedures that the UE may use depending on certain conditions (for example the type of service required). In this example, the rules may direct the UE to perform one of the following procedures: to use a grant-free procedure when transmission of data is required and to use a fallback procedure comprising the use of a grant-based procedure in the case where the grant-free procedure fails; or to use a grant-based procedure; or to use a grant-free procedure for downlink only. At 303, the UE takes into account the configuration received when initiating access to the NR RAN. If the UE wishes to transmit data and the rules dictate that a grant-free procedure may be used, then at 304, the UE chooses this access procedure and at 305 sends a data transmission to the gNB without any grant provision. If, at 306 the UE notices that the grant-free procedure has failed, then at 307, as dictated by the rules, the UE falls back to the grant-based procedure and at 308 requests a grant provision from the gNB. The UE may deduce that the grant-free procedure has failed if it received no acknowledgement from the gNB. Failure can result because of concurrent access attempts from other UE's in the cell 103. The request for a grant provision is followed by transmission of the grant provision at 309 from the gNB to the UE. Once the UE has received the grant provision, it can transmit its data based thereon at 310. Alternatively, the rules may dictate that the UE choose always to transmit data based on a grant provision. In this case, at 311 uses the grant-based procedure. In this case, at 312 steps 308-310 as above are carried out. If the rules dictate that the grant-free procedure should be used for downlink only (at 313), then a grant provision for downlink is sent from the gNB to the UE at 314 and at 315 the UE makes a data transmission towards the gNB based on the received grant provision.

An advantage of indicating the use of the grant-free procedure for downlink only is to reduce latency between the UE and the gNB. The gNB has already allocated resources for continuous downlink data transmissions to the UE since the gNB has knowledge about the size of the downlink transmissions. The UE does not need to request grant allocation by performing a grant-based procedure with or without contention. To achieve a similar advantage in the uplink, the gNB needs to know the average size of the uplink transmissions. The UE can indicate this information to the gNB. Then the gNB can pre-allocate the grant for uplink transmissions and configure the UE to use the grant-free procedure.

An advantage of indicating the use of the grant-based procedure is to reduce the latency in cases of variable sizes of data transmissions. In a case where the size of data transmissions happens to temporarily exceed a threshold for data transmission for a fixed allocated grant, then the UE splits the data into smaller data transmissions and avoids a request for grant allocation. Temporarily exceeding the threshold can happen in the scenario of data bursts from the application (e.g. IP) layers. The advantage of indicating the use of a grant-based and a grant-free procedure is to reduce the number of small data transmissions for such a scenario where the UE indicates the size of grant to be allocated by the gNB, thereby reducing the latency of the feedback from peer application layers.

The request for grant provision at step 308 can be implemented as a buffer size indication from the UE to the gNB to enable the latter to allocate an adequate grant size. The benefit of this is to avoid multiple small data transmissions and allow a larger data transmission instead. The gNB can also trigger the UE to provide such a buffer size indication. An indication of the buffer size for pending data for transmission can also be sent along with data. This allows the UE to optimise its processing and so reduces power consumption.

Figure 4:
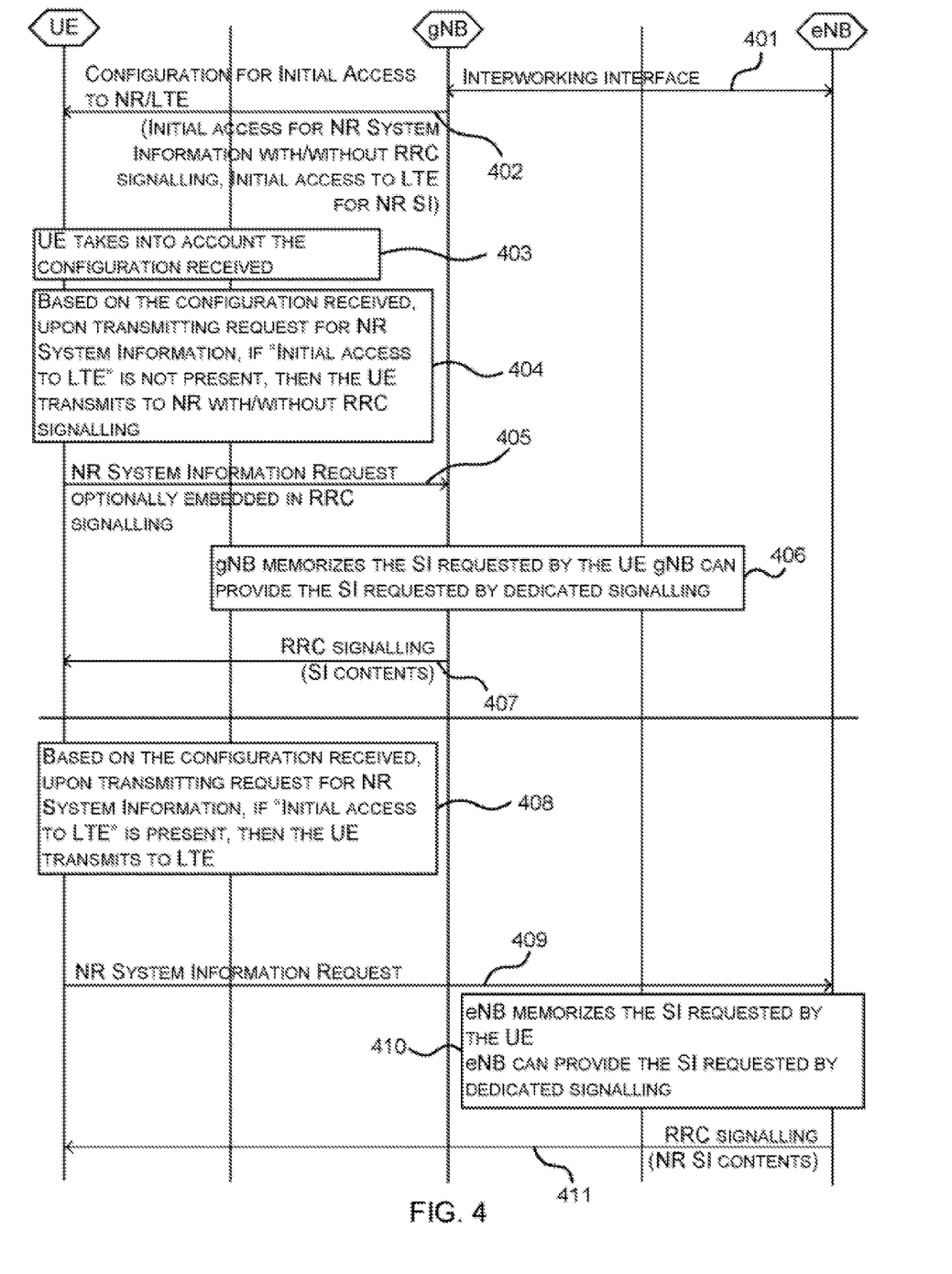
FIG. 4 is a message sequence chart illustrating a third example of a sequence of operations for accessing Radio Access Network services.

Referring now to FIG. 4, at 401 an interworking interface is established between the gNB 101 and the eNB 105 of the systems described above with reference to FIG. 1. At 402, the gNB sends to the UE (102 of FIG. 1) configuration information for initial access (of the UE 102) to the NR or LTE network for requesting NR System Information (SI) with or without RRC signalling via the gNB or via the eNB. At 403, the UE receives the configuration information and takes this into account when selecting an access procedure. At 404, based on the configuration received, if "initial access to LTE" is not present in the configuration, then the UE transmits, at 405, a request for NR SI with or without signalling. If the UE chooses to use signalling, then at 405 it embeds the SI request in the RRC signalling. At 406, the gNB memorises the SI requested by the UE and at 407 provides the SI requested by dedicated RRC signalling. If, alternatively, "initial access to LTE" is present in the configuration information, then at 408 the UE may choose to transmit its request for NR System Information to the eNB of the LTE network. In this case, at 409 the UE sends the NR SI request to the eNB. At 410, the eNB memorises the SI requested by the UE and at 411 sends the requested NR SI information to the UE.

The signal processing functionality of the embodiments of the invention especially the gNB and the UE may be achieved using computing systems or architectures known to those who are skilled in the relevant art. Computing systems such as, a desktop, laptop or notebook computer, hand-held computing device (PDA, cell phone, palmtop, etc.), mainframe, server, client, or any other type of special or general purpose computing device as may be desirable or appropriate for a given application or environment can be used. The computing system can include one or more processors which can be implemented using a general or special-purpose processing engine such as, for example, a microprocessor, microcontroller or other control module.

The computing system can also include a main memory, such as random access memory (RAM) or other dynamic memory, for storing information and instructions to be executed by a processor. Such a main memory also may be used for storing temporary variables or other intermediate information during execution of instructions to be executed by the processor. The computing system may likewise include a read only memory (ROM) or other static storage device for storing static information and instructions for a processor.

The computing system may also include an information storage system which may include, for example, a media drive and a removable storage interface. The media drive may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media may include, for example, a hard disk, floppy disk, magnetic tape, optical disk, CD or DVD, or other fixed or removable medium that is read by and written to by media drive. The storage media may include a computer-readable storage medium having particular computer software or data stored therein.

In alternative embodiments, an information storage system may include other similar components for allowing computer programs or other instructions or data to be loaded into the computing system. Such components may include, for example, a removable storage unit and an interface, such as a program cartridge and cartridge interface, a removable memory (for example, a flash memory or other removable memory module) and memory slot, and other removable storage units and interfaces that allow software and data to be transferred from the removable storage unit to computing system.

The computing system can also include a communications interface. Such a communications interface can be used to allow software and data to be transferred between a computing system and external devices. Examples of communications interfaces can include a modem, a network interface (such as an Ethernet or other NIC card), a communications port (such as for example, a universal serial bus (USB) port), a PCMCIA slot and card, etc. Software and data transferred via a communications interface are in the form of signals which can be electronic, electromagnetic, and optical or other signals capable of being received by a communications interface medium.

In this document, the terms 'computer program product', 'computer-readable medium' and the like may be used generally to refer to tangible media such as, for example, a memory, storage device, or storage unit. These and other forms of computer-readable media may store one or more instructions for use by the processor comprising the computer system to cause the processor to perform specified operations. Such instructions, generally referred to as 'computer program code' (which may be grouped in the form of computer programs or other groupings), when executed, enable the computing system to perform functions of embodiments of the present invention. Note that the code may directly cause a processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system using, for example, removable storage drive. A control module (in this example, software instructions or executable computer program code), when executed by the processor in the computer system, causes a processor to perform the functions of the invention as described herein.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other sub-system element.

It will be appreciated that, for clarity purposes, the above description has described embodiments of the invention with reference to a single processing logic. However, the inventive concept may equally be implemented by way of a plurality of different functional units and processors to provide the signal processing functionality. Thus, references to specific functional units are only to be seen as references to suitable means for providing the described functionality, rather than indicative of a strict logical or physical structure or organisation.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term 'comprising' or "including" does not exclude the presence of other elements.

What is claimed is:

1. A method for enabling a wireless communication device to access services provided by a radio access network, the method comprising:
   the wireless communication device being configured with configuration information, wherein the configuration information comprises rules for selecting one or more of a plurality of access procedures to be used by the wireless communication device for accessing radio access network services and wherein the access procedures include:
   a two-step initial access procedure; and
   a four-step initial access procedure;
   wherein the wireless communication device is arranged to select one of the procedures and further adapt the rules for selecting one or more of said plurality of access procedures to be used for accessing services based on a result of a previous access attempt.

2. The method of claim 1 comprising, at the wireless communication device, informing a base station of its capabilities with regard to which access procedure the wireless communication device is capable of using.

3. The method of claim 1 comprising the wireless communication device receiving the configuration information transmitted from a base station to the wireless communication device.

4. The method of claim 2 comprising the wireless communication device receiving the configuration information transmitted from the base station wherein the configuration information is tailored to match the capabilities of the wireless communication device.

5. The method of claim 1 wherein the signaling message comprises a Radio Resource Control message.

6. The method of claim 1 wherein the access procedures include:
   a procedure including use of a signaling message with a random access procedure; and
   a procedure including use of a signaling message without a random access procedure.

7. The method of claim 1 wherein the access procedures include a procedure including use of a signaling message, and the method comprises:
   the wireless communication device sending a request for requesting system information; and
   the wireless communication device, through the procedure including use of a signaling message, receiving the system information.

8. The method of claim 7 wherein the signaling message comprises a request sent from the wireless communication device to the radio access network for requesting system information, and the signaling message comprises system information sent from the radio access network to the wireless communication device in response to the request.

9. The method of claim 7 wherein the procedure including use of a signaling message is an initial access.

10. The method of claim 9 wherein the procedure including use of a signaling message is a four-step initial access or a two-step initial access.

11. The method of claim 9 wherein the procedure includes use of a signaling message is a contention-based random access or a non-contention based random access.

12. The method of claim 1 wherein the rules are based on a type of service required by the wireless communication device.

13. The method of claim 12 wherein the type of service includes at least one of:
   transmission and/or reception of data;
   transmission and/or reception of a voice call;
   transmission and/or reception of a signaling message;
   a request for System Information;
   delay tolerant access;
   transmission of a Location Update; and
   transmission of an exceptional event.

14. The method of claim 1 comprising, at the wireless communication device, including an indication of its current state in a data transmission to a base station.

15. The method of claim 1 comprising establishing an interworking interface between the radio access network and an alternative radio access network.

16. The method of claim 1 wherein the radio access network is a New Radio/5G network.

17. The method of claim 1 wherein the access procedures include one or more of the following:
   a grant-free procedure;
   a grant-free procedure for downlink only;
   a procedure not including use of a signalling message;
   a fallback procedure to be used in cases of failure of an initial access attempt; and
   accessing an alternative radio access network.

18. A non-transitory computer readable medium having computer readable instructions stored thereon for execution by a processor to perform the method according to claim 1.

19. A wireless communication device comprising a processor configured with configuration information comprising rules for selecting one or more of a plurality of access procedures to be used by the wireless communication device for accessing radio access network services and wherein the access procedures include:
   a two-step initial access procedure; and
   a four-step initial access procedure;
   wherein the wireless communication device is arranged to select one of the procedures and further adapt the rules for selecting one or more of said plurality of access procedures to be used for accessing services based on a result of a previous access attempt.

20. The device of claim 19 wherein the signaling message comprises a Radio Resource Control message.

21. The device of claim 19 wherein the access procedures include:
   a procedure including use of a signaling message with a random access procedure; and
   a procedure including use of a signaling message without a random access procedure.

22. The device of claim 19 wherein the access procedures include a procedure including use of a signaling message, and the method comprises:
   the wireless communication device sending a request for requesting system information; and
   the wireless communication device, through the procedure including use of a signaling message, receiving the system information.

23. The device of claim 22 wherein the signaling message comprises a request sent from the wireless communication device to the radio access network for requesting system information, and the signaling message comprises system information sent from the radio access network to the wireless communication device in response to the request.

24. The device of claim 22 wherein the procedure including use of a signaling message is an initial access.

25. The device of claim 24 wherein the procedure including use of a signaling message is a four-step initial access or a two-step initial access.

26. The device of claim 24 wherein the procedure including use of a signaling message is a contention-based random access or a non-contention based random access.

27. The device of claim 19 wherein the rules are based on a type of service required by the wireless communication device.

28. The device of claim 27 wherein the type of service includes at least one of:
   transmission and/or reception of data;
   transmission and/or reception of a voice call;
   transmission and/or reception of a signaling message;
   a request for System Information;
   delay tolerant access;
   transmission of a Location Update; and
   transmission of an exceptional event.

29. A method for enabling a wireless communication device to access services provided by a radio access network, the method comprising:
   the wireless communication device being configured with configuration information, wherein the configuration information comprises rules for selecting one or more of a plurality of access procedures to be used by the wireless communication device for accessing radio access network services and wherein the access procedures include:
   a two-step initial access procedure;
   a four-step initial access procedure; and
   a procedure including use of a signaling message without a random access procedure and without grant, wherein the wireless communication device is arranged to select one of the procedures and further adapt the rules for selecting one or more of said plurality of access procedures to be used for accessing services based on a result of a previous access attempt.

30. A method for enabling a wireless communication device to access services provided by a radio access network, the method comprising:

the wireless communication device being configured with configuration information for initial access of the wireless communication device for requesting radio access network system information (SI), wherein the configuration information comprises rules for selecting one or more of a plurality of access procedures to be used by the wireless communication device for accessing radio access network services and wherein the access procedures include:

a two-step initial access procedure; and a four-step initial access procedure;

wherein the wireless communication device is arranged to select one of the procedures and further adapt the rules for selecting one or more of said plurality of access procedures to be used for accessing services based on a result of a previous access attempt.

* * * * *